United States Patent [19]
Park

[11] Patent Number: 5,428,184
[45] Date of Patent: Jun. 27, 1995

[54] KARAOKE CIRCUIT FOR OPTICAL DISK PLAYER

[75] Inventor: In-sik Park, Suwon, Rep. of Korea

[73] Assignee: Samsung Electronics Co., Ltd., Suwon, Rep. of Korea

[21] Appl. No.: 13,951

[22] Filed: Feb. 5, 1993

[30] Foreign Application Priority Data

Feb. 28, 1992 [KR] Rep. of Korea ............... 92-3251

[51] Int. Cl.6 .................... G11B 7/00; G11B 20/00
[52] U.S. Cl. ........................ 84/609; 84/634; 84/625; 369/4
[58] Field of Search ................... 369/1-5, 369/47, 48, 49, 50, 32, 58, 86, 87, 124; 358/341, 342, 343; 84/602, 609, 610, 615, 623, 625, 634, 645; 360/27, 55, 61

[56] References Cited

U.S. PATENT DOCUMENTS

| | | | |
|---|---|---|---|
| 4,953,212 | 8/1990 | Otsubo | 381/1 |
| 5,172,354 | 12/1992 | Otsubo | 369/44.27 |
| 5,177,728 | 1/1993 | Otsubo et al. | 369/48 |

FOREIGN PATENT DOCUMENTS

| | | | |
|---|---|---|---|
| 3113478 | 5/1991 | Japan | 84/625 |
| 2229309 | 9/1990 | United Kingdom | 369/86 |

*Primary Examiner*—Robert J. Pascal
*Assistant Examiner*—Arnold Kinkead
*Attorney, Agent, or Firm*—Sughrue, Mion, Zinn, Macpeak & Seas

[57] ABSTRACT

A karaoke circuit for an optical player including a mixing circuit for mixing signals reproduced from the optical disk to supply them to a speaker, a selector for selecting a digital channel signal recorded on the optical disk, an analog channel signal recorded on the optical disk or a vocal signal of either the analog left channel or the analog right channel according to a user's selection and supplying the selected signal to the mixing circuit, and a path controller for controlling the path of the selector according to a user's mode selection and according to a disk type, thereby simplifying the circuitry and mixing stereo accompaniment and a vocal signal during playback of a hi-fi multivoice disk to improve the sound quality of karaoke.

10 Claims, 3 Drawing Sheets

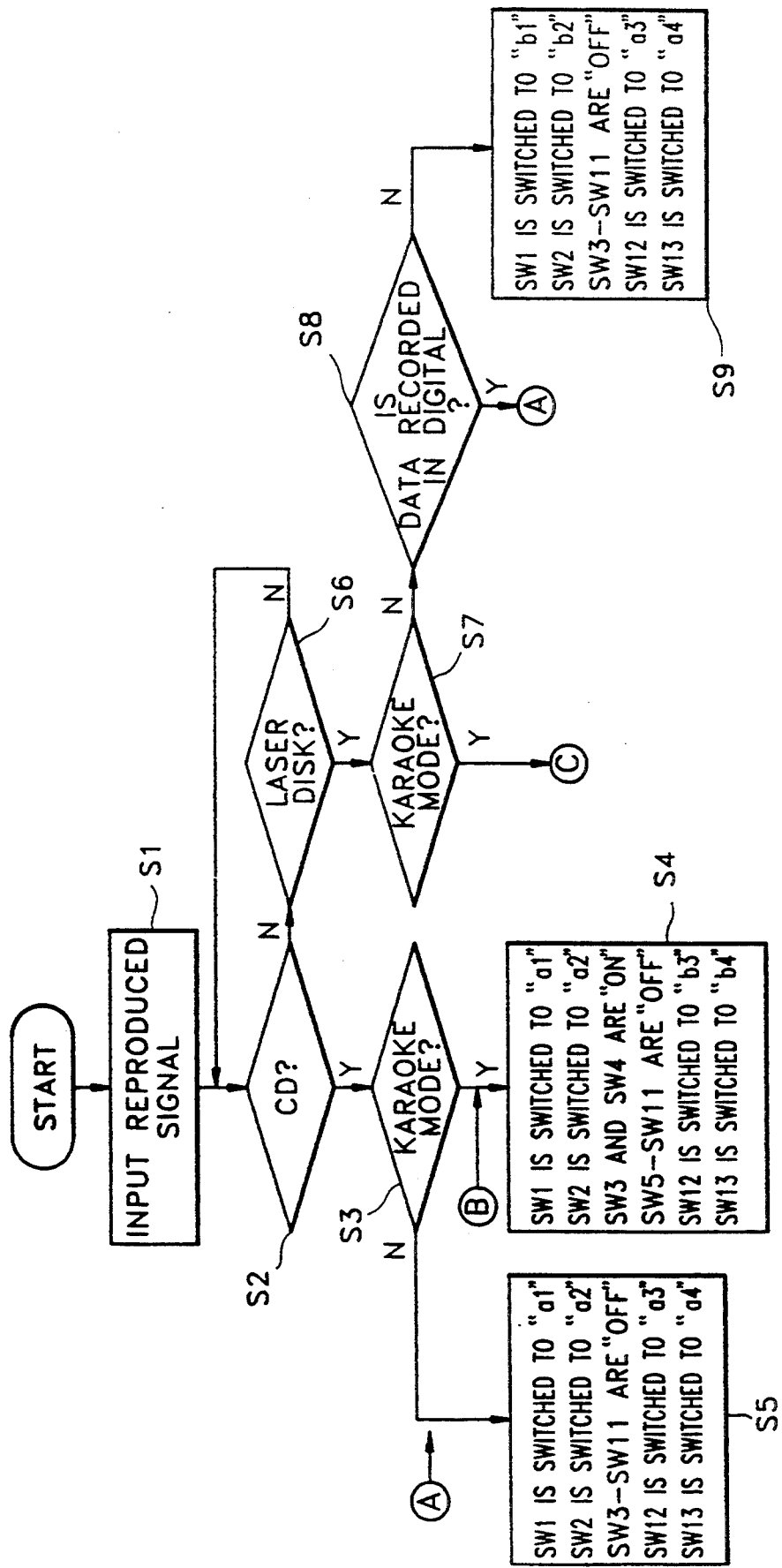

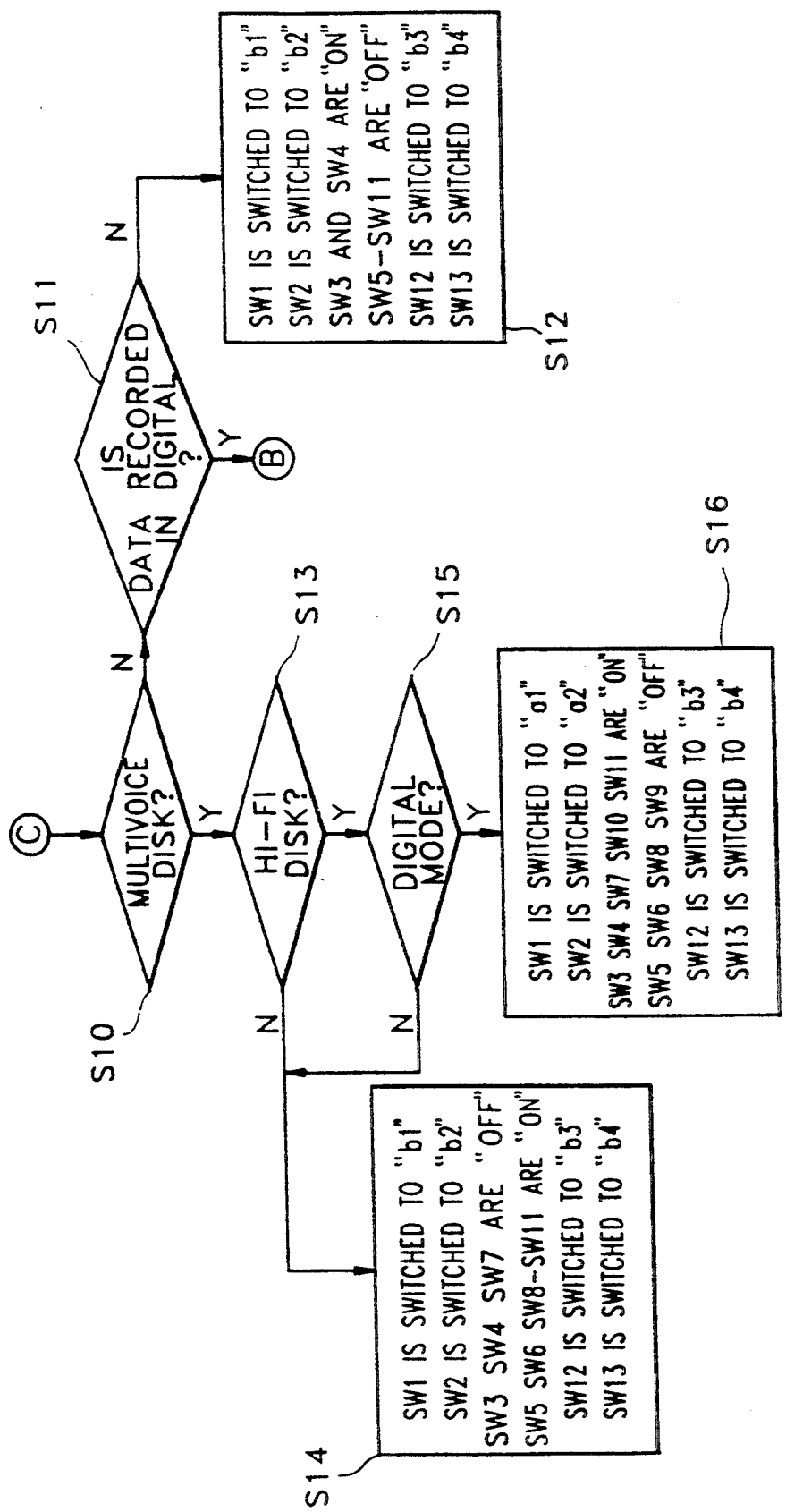

KARAOKE CIRCUIT FOR OPTICAL DISK PLAYER

BACKGROUND OF THE INVENTION

The present invention relates to a karaoke circuit for optical disk players, and more particularly to a karaoke circuit with improved sound quality and simplified circuitry.

Generally, an optical disk player (laser disk player) records a signal on a disk in digital form, projects coherent light such as a laser beam onto the disk's surface, and receives reflected light, so as to reproduce information according to the variations in the intensity of the reflected light.

Recently, an optical player was developed incorporating a karaoke circuit which outputs a mixed music/vocal signal (a musical accompaniment audio signal and a voice-over audio signal), besides simply playing music (the music signal).

Meanwhile, the optical disk player outputs signals corresponding to respective channels according to disk type, as shown in TABLE 1.

TABLE 1

| disk type | music recording method | recorded format by channels | |
|---|---|---|---|
| | | L-channel | R-channel |
| CD | digital | stero signal | stero signal |
| general LD | analog | stero signal | stero signal |
| | digital | stero signal | stero signal |
| analog multivoice LD | analog | mono accompaniment | vocal + mono accompaniment |
| hi-fi multivoice LD | analog | mono accompaniment | vocal + mono accompaniment |
| | digital | stero accompaniment | stero accompaniment |

If the utilized disk is a compact disk (CD), stereo signals are output through the left and right channels and the music recording method is digital. Here, CDs are divided into two types, in one of which only music is loaded (i.e., a classical music CD) and in the other of which the music and a vocal signal are loaded together (i.e., a popular music CD). In the latter type CD, a stereo signal mixed with a vocal signal is transmitted to the left and right channels. If the disk is an analog multivoice laser disk (LD), the music recording method is analog, and mono accompaniment (i.e., instrumental music without vocals) is output through the left channel and a vocal signal mixed with mono accompaniment is output through the right channel.

If the disk is a hi-fi multivoice LD, since the music recording method is both analog and digital, when the analog recording method is selected as the output mode, mono accompaniment is output through the left channel and mono accompaniment and a vocal signal are output through the right channel, and when the digital recording method is selected, stereo accompaniment signals (i.e., instrumental music without vocals) are output through the left and right channels.

Here, the CD is a disk in which only audio signals are loaded and the LD is a disk in which both an audio signal and possibly a video signal are loaded. The term "multivoice" indicates that different signals are loaded in the left and right channels; for instance, mono accompaniment is loaded in the left channel while vocal signal and mono accompaniment are loaded in the right channel. In a hi-fi multivoice LD, as shown in TABLE 1, data is recorded in two forms (analog and digital).

Accordingly, with respective channels for the various disks, the conventional optical disk player has a complicated circuitry which increases the production cost. Additionally, if the disk type is the hi-fi multivoice LD, since the output is generated according to the selected recording method (analog or digital), in the case of a karaoke mode, a mixed signal of analog mono accompaniment and vocal signal from the right channel is output through a speaker, which reduces the sound quality.

SUMMARY OF THE INVENTION

Therefore, it is an object of the present invention to provide a karaoke circuit for an optical disk player which simplifies the respective channels for various disks and, if a hi-fi multivoice optical disk is reproduced, mixes a vocal signal with stereo accompaniment and supplies the mixed signal to both channels.

To accomplish the object, there is provided a karaoke circuit for an optical player of the present invention for an optical disk player having a karaoke mode for controlling an interval signal while reproducing an analog or a digital signal recorded according to optical disk type and a normal mode for reproducing recorded information as it is, which comprises: a mixing circuit for mixing signals reproduced from optical disk to supply them to a speaker; a selector for selecting a digital channel signal or an analog channel signal recorded on the optical disk, or a vocal signal of the digital channel or the analog channel according to a user's selection for combination and supplying the selected signal to the mixing circuit; and a path controller for controlling the path of the selector means according to a user's mode selection and the disk type.

BRIEF DESCRIPTION OF THE DRAWINGS

The above object and other advantages of the present invention will become more apparent by describing in detail a preferred embodiment thereof with reference to the attached drawings in which:

FIGS. 2A and 2B are a flowchart showing the control of the switching states of control switches according to the optical disk type and user mode selection, as performed by the microcomputer shown in FIG. 1.

DETAILED DESCRIPTION OF THE INVENTION

Figure 1:
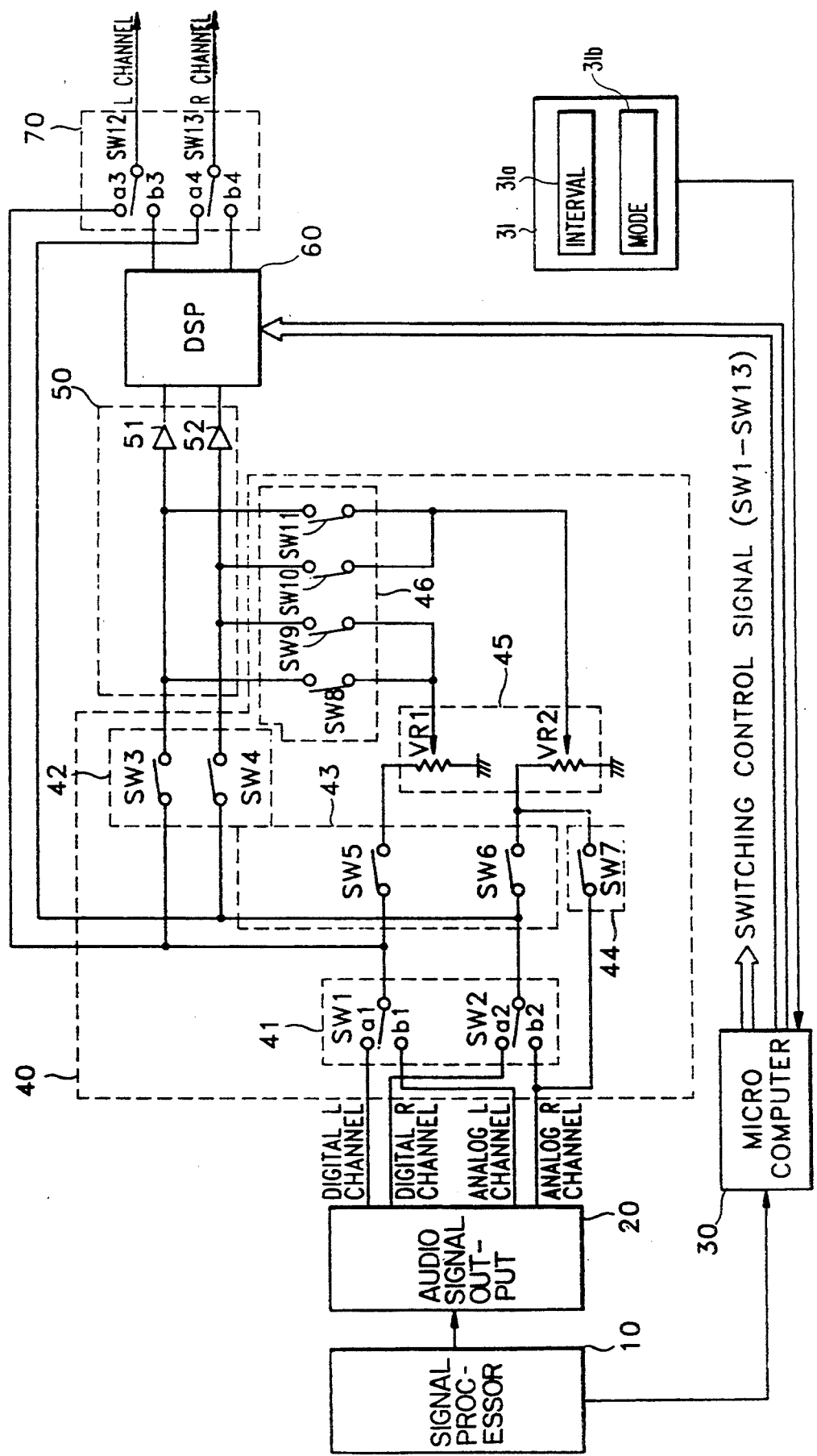
FIG. 1 is a circuit diagram of one embodiment of a karaoke circuit for an optical disk player according to the present invention.

Referring to FIG. 1, the karaoke circuit of the present invention comprises: a signal processor 10 for processing a signal reproduced from an optical disk on which signals are recorded in digital form, such as a CD, multivoice LD, or a hi-fi multivoice LD; an audio signal output circuit 20 for outputting the signal processed by signal processor 10 to digital left and right channels and analog left and right channels all in analog form, a microcomputer 30 for recognizing the disk type, by the signal processed by signal processor 10, and whether the current mode is a normal mode or a karaoke mode, so as to output a switching control signal, a selector 40 for selecting a digital left/right channel signal, an analog left/right channel signal or digital left/right channel signal and a vocal signal of analog right channel among the signals output from audio signal output 20 according to the switching control signal output from microcomputer 30, a mixing circuit 50 primarily composed of buffers for mixing an analog audio signal and a digital audio signal output from selector 40 and outputting them, a digital signal processor (DSP) 60 for controlling the interval of the signal output from mixing circuit 50 under the control of microcomputer 30 which recognizes a user-designated interval control key, 31a of input device 31 and outputting the interval-controlled signal as a left channel signal and a right channel signal to a speaker (not shown), and an output portion 70 composed of control switches SW12 and SW13 for selecting the output signal of DSP 60 or the output signal of a first selector 41 located inside of selector 40 and outputting the selected signal as the final signal of the left and right channels.

Here, selector 40 comprises: the first selector 41 having a first control switch SW1 for selecting the analog audio signal and digital audio signal of frequency band for the left channel which are output from audio signal output 20, and a second control switch SW2 for selecting the analog audio signal and digital audio signal for the right channel which are also output from audio signal output 20; a second selector 42 having third and fourth control switches SW3 and SW4 for switching the digital audio signals for the left and right channels which are selected by first selector 41, so as to feed them to mixing circuit 50; a third selector 43 having fifth and sixth control switches SW5 and SW6 for switching the analog audio signals for the left and right channels which are selected by first selector 41; a fourth selector 44 having a seventh control switch SW7 for switching an analog vocal signal output from audio signal output 20 and loaded on the right channel; a volume controller 45 having a variable resistor VR1 for controlling the volume of an analog signal switched by fifth control switch SW5, and a variable resistor VR2 for controlling the volume of an analog signal switched by sixth or seventh control switches SW6 or SW7; and a fifth selector 46 having eighth and ninth control switches SW8 and SW9 for transmitting the signal whose volume is controlled by variable resistor VR1 to the left and right channels to supply the signal to mixing circuit 50, and tenth and eleventh control switches SW10 and SW11 for transmitting the signal whose volume is controlled by variable resistor VR2 to the left and right channels to supply the signal to mixing circuit 50.

Now, the operation of the karaoke circuit shown in FIG. 1 of the present invention will be described below with reference to the flowchart of FIGS. 2A and 2B.

First, when a user sets an optical disk player to a karaoke mode using a user-operated button 31b and reproduces a signal from a compact disk (CD), the signal reproduced from the optical disk player is processed by signal processor 10 (step S1). Microcomputer 30 recognizes the fact that the signal processed by signal processor 10 is a digital signal and that the disk is a compact disk, and outputs a switching control signal corresponding to the recognized compact disk (digital) and the karaoke mode (steps S2 and S3). Here, microcomputer 30 recognizes the disk type using a recognizing signal which is output from signal processor 10 and is loaded according to the disk type. The signal output from signal processor 10 to the digital left and right channels is output as an analog signal via a D/A converter (not shown).

More specifically, microcomputer 30 outputs a switching control signal to select a digital signal. The switching control signal switches to connect first and second control switches SW1 and SW2 to their respective first contact points a1 and a2, switches off each of fifth to eleventh control switches SW5–SW11 and switches to connect twelfth and thirteenth control switches SW12 and SW13 to their second contact points b3 and b4, so that the digital signal reproduced from the compact disk is output via the digital left and right channels not via multivoice balance volume circuitry.

The signals output via the digital left and right channels are input to DSP 60 via buffers 51 and 52 of mixing circuit 50. Microcomputer 30 recognizes the input of a well-known interval control key designated by a user, and outputs a corresponding control signal to DSP 60. DSP 60 operates in a well-known manner to control the interval of the audio signal for the digital left and right channels according to an interval control signal output from microcomputer 30 to output the interval-controlled audio signal to a speaker as a stereo signal.

Here, in the case of a CD loaded with both musical accompaniment and a vocal signal, DSP 60 controls the interval in a well-known manner to output a stereo signal mixed with the vocal signal to the left and right channels or eliminates the vocal signal to output only a stereo musical accompaniment signal to the left and right channels. In the case of a CD loaded with only music, DSP 60 controls the interval to output a stereo musical accompaniment signal to the left and right channels.

If the CD is reproduced in the normal (non-Karaoke) mode, microcomputer 30 switches first and second control switches to connect SW1 and SW2 to their respective first contact points a1 and a2, switches off third through eleventh control switches SW3–SW11, and switches to connect twelfth and thirteenth control switches SW12 and SW13 to their respective first contact points a3 and a4, so that the output of audio signal output 20 transmitted to the digital left and right channels is output to the left and right channels via output portion 70 (step S5).

If a laser disk (LD) is reproduced in the normal mode, when its data is recorded in digital form, microcomputer 30 controls the switches in the same manner as the case when a CD is reproduced in the normal mode. When the data on an LD is recorded in analog form, microcomputer 30 switches to connect first and second control switches SW1 and SW2 to their respective second contact points b1 and b2, switches off third through eleventh control switches SW3–SW11, and switches to connect twelfth and thirteenth control switches SW12 and SW13 to their respective first contact points a3 and a4, so that the output of audio signal output 20 transmitted to the analog left and right channels is output to the left and right channels via output portion 70 (steps S6–S9).

If a general LD (not a multi-voice disk) is reproduced in the karaoke mode, when its data is recorded in digital form, microcomputer 30 controls the switches in the same manner as the case when a CD is reproduced in the karaoke mode. When the data is recorded in analog form, microcomputer 30 switches to connect first and second control switches SW1 and SW2 to their respective second contact points b1 and b2, switches on third and fourth control switches SW3 and SW4, switches off fifth through eleventh control switches SW5–SW11, and switches to connect twelfth and thirteenth switches SW12 and SW13 to their respective second contact points b3 and b4, so that the output of audio signal output 20 transmitted to the analog left and right channels is interval-controlled by DSP 60 and is output to the left and right channels via output portion 70 (steps S10–S12).

When a user uses an optical disk player to set its mode to a karaoke mode with a user-controlled button and reproduces an analog multivoice optical disk, a signal reproduced by a pickup (not shown) of the optical disk player is processed by signal processor 10. Microcomputer 30 recognizes the fact that the recording method of the optical disk is analog and that the disk is a multivoice disk according to a disk recognizing signal among the signals processed in signal processor 10, and outputs a switching control signal according to the result.

More specifically, in order to select a signal for the analog channel band, the switching control signal switches to connect first, second, twelfth and thirteenth control switches SW1, SW2, SW12 and SW13 to their respective second contact points b1, b2, b3 and b4, switches on each of control switches SW5, SW6, SW8, SW9, SW10 and SW11 and switches off control switches SW3, SW4 and SW7.

If a signal recorded on an analog multivoice optical disk is reproduced, an analog multivoice signal is output so that mono accompaniment is output through the analog left channel and a vocal signal mixed with mono accompaniment is output through the right channel. Here, the user controls the multivoice volume balance by varying variable resistors VR1 and VR2 to output either only the mono accompaniment or the vocal signal with the mono accompaniment to the left and right channels via buffers 51 and 52 and DSP 60. Here, both the mono accompaniment and vocal signal output from DSP 60 are loaded on each of the left and right channels. DSP 60 controls the interval of the signal according to the control signal output from microcomputer 30 which recognizes a designated interval control key and outputs the controlled signal to the speaker via output portion 70 (steps S13 and S14).

When a user uses an optical disk player to set its mode to a karaoke mode and to a digital mode with a user-controlled button, a signal reproduced by a hi-fi multivoice optical disk is processed by signal processor 10. Microcomputer 30 recognizes the fact that the recording method of the optical disk is digital and the disk is a hi-fi multivoice disk, and outputs a switching control signal according to the result.

More specifically, in order to select a digital channel band signal, the switching control signal switches to connect first and second control switches SW1 and SW2 to their respective first contact points a1 and a2, switches on each of control switches SW3, SW4, SW7, SW10 and SW11, switches off control switches SW5, SW6, SW8 and SW9, switches twelfth and thirteenth control switches SW12 and SW13 to their respective second contact points b3 and b4.

If the hi-fi multivoice disk is so reproduced in the digital mode, stereo accompaniment is output through the digital left and right channels and a vocal signal is output through the analog right channel. The stereo accompaniment and vocal signal are mixed by mixing circuit 50 to be input to DSP 60 which controls the interval of the signal mixed with the stereo accompaniment and analog vocal signal output from the digital left and right channels according to a designated interval control key. The hi-fi multivoice signal is output as left and right channel signals.

Here, the multivoice balance volume of the vocal signal output via seventh control switch SW7 is controlled by variable resistor VR2 and is fed to buffers 51 and 52 via control switches SW10 and SW11 (steps S15 and S16).

Even while a user reproduces the hi-fi multivoice disk, if the user sets its mode to a karaoke mode with the analog multivoice setting so as to listen only to an analog signal, a reproduced signal is processed by signal processor 10. Microcomputer 30, which recognizes a disk-recognizing signal and a currently set mode from the processed signal, outputs a switching control signal according to the result, similar to that when the analog multivoice disk is reproduced. Therefore, the hi-fi multivoice disk is capable of selecting between the multivoice karaoke mode and the analog multivoice mode.

The karaoke circuit of the present invention comprises a display (not shown) for displaying the currently reproduced disk type and the currently set mode.

Here, the states of first to eleventh control switches SW1 to SW11 according to disk types during a karaoke mode are shown in the following TABLE 2.

TABLE 2

| switch | compact disk | analog multivoice LD | hi-fi multivoice LD | |
| --- | --- | --- | --- | --- |
| | | | digital | analog |
| SW1 | a1 | b1 | a1 | b1 |
| SW2 | a2 | b2 | a2 | b2 |
| SW3 | H | L | H | L |
| SW4 | H | L | H | L |
| SW5 | L | H | L | H |
| SW6 | L | H | L | H |
| SW7 | L | L | H | L |
| SW8 | L | H | L | H |
| SW9 | L | H | L | H |
| SW10 | L | H | H | H |
| SW11 | L | H | H | H |
| SW12 | a3 | b3 | b3 | b3 |
| SW13 | a4 | b4 | b4 | b4 |

As described above in detail, the karaoke circuit for an optical disk of the present invention simplifies the circuit structure formerly having respective channels for various disk types and, during hi-fi multivoice disk playback, outputs a mixed signal of stereo accompaniment and a vocal signal to each of left and right channels, so as to improve the sound quality.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A karaoke circuit for an optical disk player having a karaoke mode for controlling an interval signal while reproducing an analog or digital signal recorded according to an optical disk type, and a normal mode for reproducing recorded information without change, said circuit comprising:

mixing means for mixing signals reproduced from an optical disk to supply them to a speaker;

selector means containing a plurality of switches for selecting one of a digital left channel signal and a digital right channel signal, an analog left channel signal and an analog right channel signal recorded on said optical disk, and the digital left/right channel signals and a vocal signal loaded on an analog channel, and supplying the selected signals to said mixing means;

path control means for issuing a control signal for controlling a path of said selector means according to a user's input selection mode signal for selecting either said karaoke mode or said normal mode, according to a detection signal indicating whether an analog or a digital recording method has been used, and according to said optical disk type;

interval control means for controlling an interval of the signal output from said mixing means according to the control signal output from said path control means according to a user-set interval control key; and output means for selecting one of an output from said interval control means and an output from said selector means according to said selection mode signal and outputting the selected output to respective left and right channels.

2. A karaoke circuit for an optical disk player as claimed in claim 1, further comprising:

signal processor means for processing a signal reproduced from an optical disk such as a compact disk, analog multivoice laser disk and hi-fi multivoice laser disk; and audio signal output means for outputting the signal processed by said signal processor means by converting a digital audio signal to analog form and outputting the converted signal via digital left and right channels, by outputting an analog output signal via analog left and right channels, and by outputting a vocal signal via any one channel only among left and right channels.

3. A karaoke circuit for an optical disk player as claimed in claim 2, wherein said selector means comprises:

a first selector for selecting, from the audio signals reproduced from said audio signal output means, art audio signal for the left and right channels of an analog frequency band and art audio signal for the left and right channels of a digital frequency band;

a second selector for switching to supply the audio signal for the left and right channels of a digital frequency band selected by said first selector to said mixing means;

a third selector for selecting the audio signal of the left and right channels of an analog frequency band selected by said first selector;

a fourth selector for selecting the vocal signal for the right channel of an analog frequency band output from said audio signal output means;

a volume controller means for controlling the volume of the signal of an analog frequency band selected by said third selector or fourth selector; and a fifth selector for supplying the volume-controlled signal output from said volume controller to said mixing means for transmission to the left and right channels.

4. A karaoke circuit for an optical disk player as claimed in claim 3, wherein said path control means recognizes a signal for detecting a disk type from the signal processed by said signal processor means so as to control the path of said selector means.

5. A karaoke circuit for an optical disk player as claimed in claim 4, wherein, if a hi-fi multivoice disk type and a digital recording method are selected, said path control means outputs an audio signal of the left and right channels of a digital frequency band selected by said first and second selectors to said mixing means, selects a vocal signal loaded on an analog channel by said fourth selector, controls the volume of the vocal signal by said volume controller, and outputs the vocal signal via said fifth selector to said mixing means.

6. A karaoke circuit for an optical disk player as claimed in claim 5, wherein, when said hi-fi multivoice disk type and said digital recording method are selected, said mixing means mixes stereo accompaniment of digital left and right channels with a vocal signed of analog right channel and outputs the mixed signal as the left and right channel signals.

7. A karaoke circuit for an optical disk player as claimed in claim 4, wherein, if a hi-fi multivoice disk for the optical disk type and an analog recording method are selected, said path control means controls to select an audio signal of the left and right channels of an analog frequency band by said first and third selectors, to control the volume of the signal by said volume controller, and to output the volume controlled signal to said mixing means circuit via said fifth selector.

8. A karaoke circuit for an optical disk player as claimed in claim 7, wherein, if an analog multivoice disk is selected, said path control means controls the path of said selection means the same as that of the hi-fi multivoice disk in the analog recording method.

9. A karaoke circuit for an optical disk player as claimed in claim 4, wherein, if a compact disk is selected, said path control means controls to select an audio signal for digital left and right channels by said first and second selectors so as to output the selected audio signal to said mixing means.

10. A karaoke circuit for an optical disk player as claimed in claim 4, wherein, in a normal mode, said path control means controls to output the output of said first selector to said output means, and in a karaoke mode, said path control means controls to output the output of said interval control means to the output means.

* * * * *